(12) United States Patent
Kumagai

(10) Patent No.: US 6,677,863 B2
(45) Date of Patent: Jan. 13, 2004

(54) ABSOLUTE ENCODER

(75) Inventor: Kaoru Kumagai, Tokyo (JP)

(73) Assignee: Kabushiki Kaisha TOPCON (JP)

( * ) Notice: Subject to any disclaimer, the term of this patent is extended or adjusted under 35 U.S.C. 154(b) by 0 days.

(21) Appl. No.: 10/115,383

(22) Filed: Apr. 3, 2002

(65) Prior Publication Data

US 2002/0140580 A1 Oct. 3, 2002

(30) Foreign Application Priority Data

Apr. 3, 2001 (JP) ........................................ 2001-105202

(51) Int. Cl.[7] .............................................. H03M 1/22
(52) U.S. Cl. ......................... 341/13; 341/8; 250/231.16
(58) Field of Search ................................ 341/13, 11, 8; 250/231.1–231.16

(56) References Cited

U.S. PATENT DOCUMENTS

| 4,291,976 A | * | 9/1981 | McMahon ............ 250/231 SE |
| 5,302,944 A | * | 4/1994 | Curtis .................... 250/231.16 |
| 5,744,795 A | * | 4/1998 | Bianchi et al. ............. 250/234 |

* cited by examiner

Primary Examiner—Howard L. Williams
(74) Attorney, Agent, or Firm—Baker Botts LLP

(57) ABSTRACT

The present invention relates to a rotary encoder for detecting an angle, and more particularly to an absolute encoder which can read a pattern even when rotating at high speed. The present invention also relates to an encoder reading device that projects a pattern formed on an encoder onto a light receiving means using light emitted from a light source means so as to read a position of the encoder. The light source means is configured to emit a pulse that is synchronized with a shift pulse for moving an electric charge to a transfer gate of the light receiving means, and that is sufficiently shorter than a time interval (accumulation time) of the shift pulse.

4 Claims, 6 Drawing Sheets

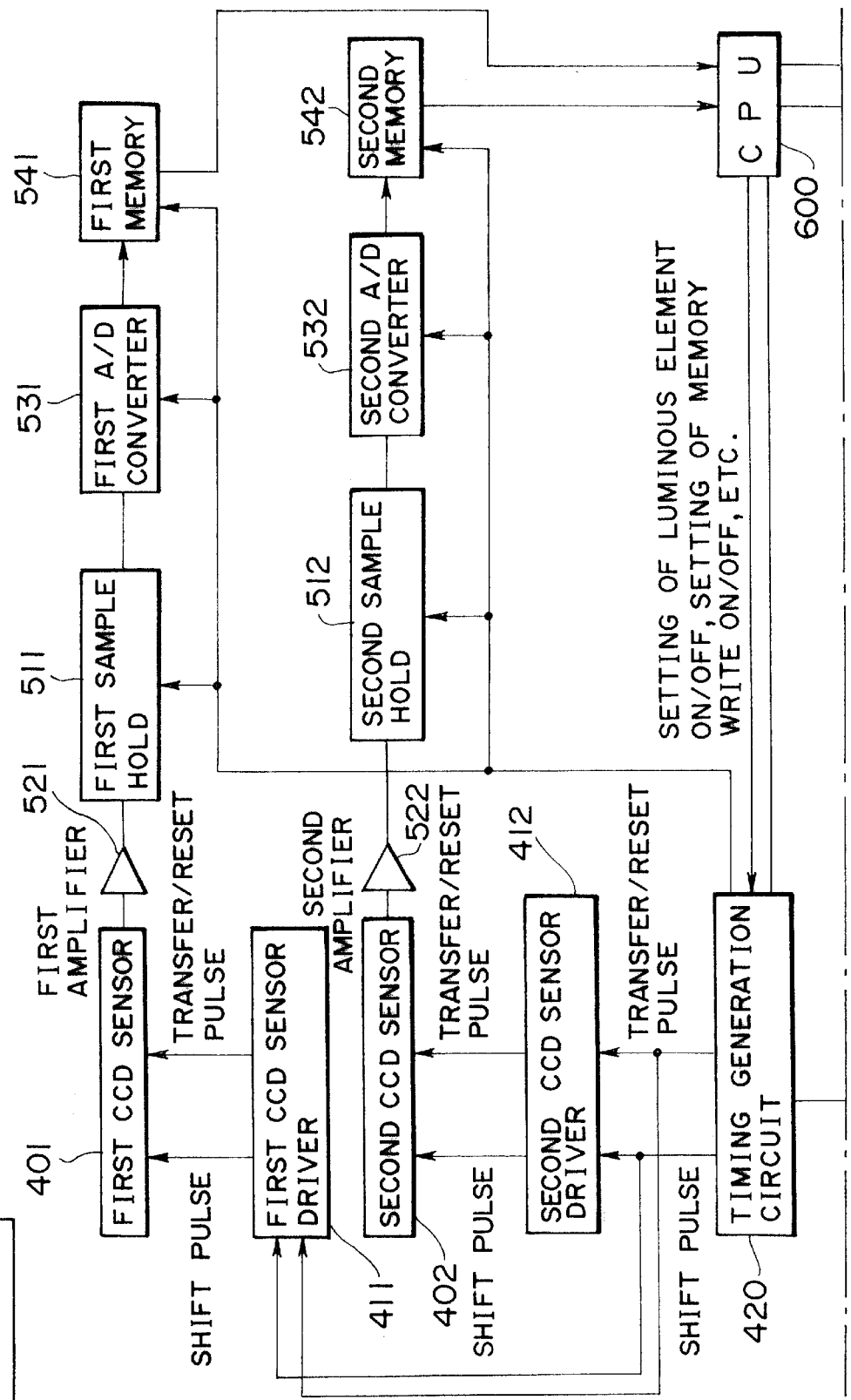

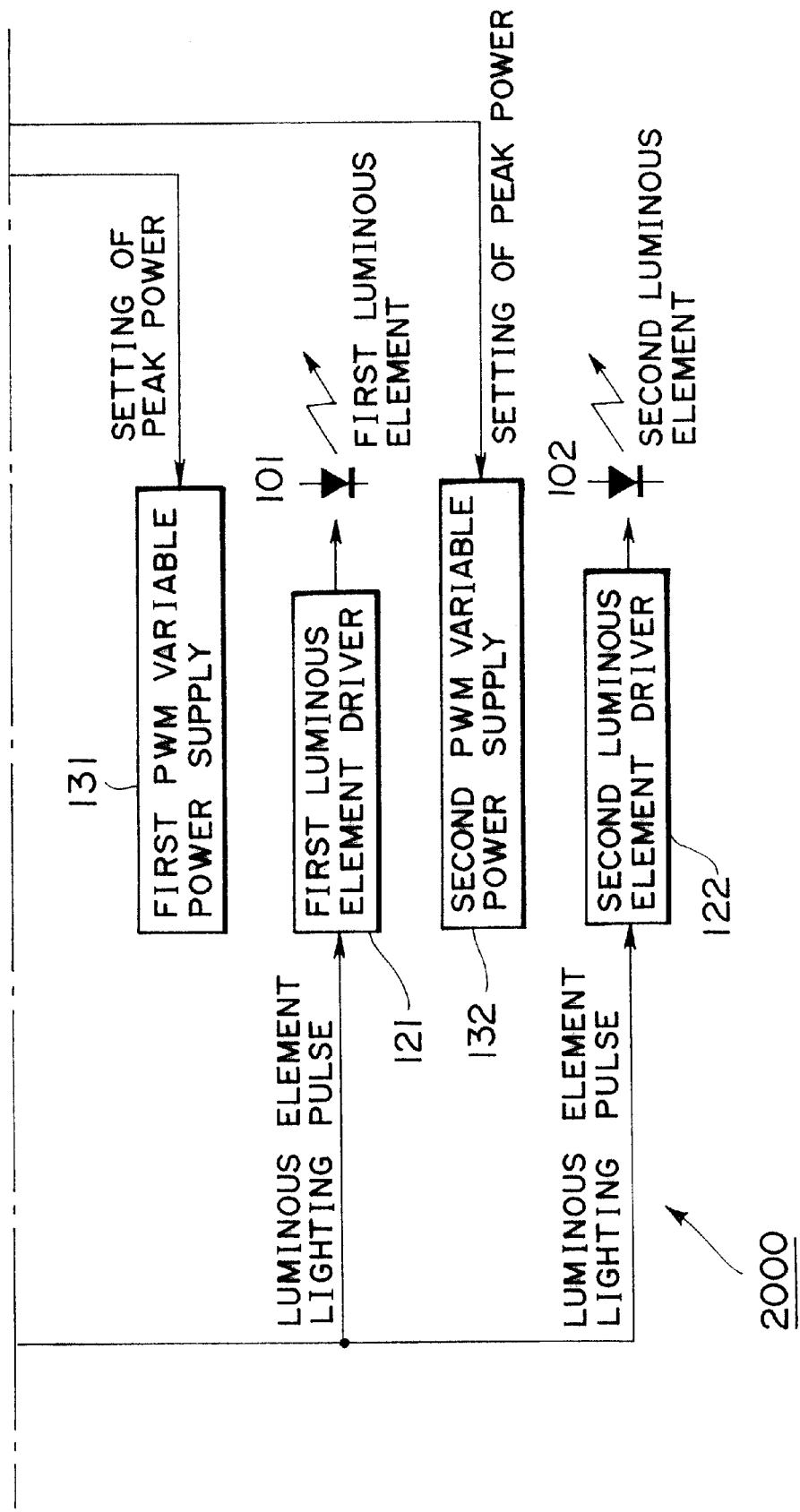

ABSOLUTE ENCODER

BACKGROUND OF THE INVENTION

The present invention relates to a rotary encoder for detecting an angle, and more particularly to an absolute encoder which can read a pattern even when rotating at high speed.

At present, an absolute type and an incremental type are employed for optical encoders that are used for a surveying instrument.

An encoder employing the incremental type converts the number of count from a zero position into an angle. The conversion into an angle requires detection of a zero position.

The absolute type encoder is of a type in which an angle value is in a one-to-one correspondence with a position on the circumference of a circle. The absolute type encoder is characterized in that since a position on the circumference is registered as an absolute address, position information can be obtained at all positions.

Thus, if the absolute encoder is used, position information can be obtained at all positions because counting is not required. However, there was the following problem because it takes time to detect and process a signal of an absolute pattern, it is disadvantageous to dynamic reading.

When an operator himself/herself conventionally operates a surveying instrument to perform surveying work, reading is basically performed after directing the surveying instrument toward a collimation direction. Therefore, even when it is rotated as fast as possible, if it is stopped finally and reading is performed in a stationary state, no problem will arise. However, there is a problem in the case of an automatic surveying instrument that automatically turns toward a target for collimation or continuously tracks a target; recently, the automatic surveying instrument is frequently used.

To be more specific, the automatic surveying instrument to which a tracking function is added continues tracking to measure a position of the target. Under the circumstances, the incremental encoder is suitable for constrained operation to some extent. However, once count is missed, it is impossible to measure an angle unless a zero position is detected again. Therefore, the incremental encoder is not suitable for such use, which is the problem.

In the absolute type encoder disadvantageous to reading during operation, when the encoder rotates at high speed while detecting an absolute pattern, the contrast of a signal waveform becomes worse, resulting in a decrease in accuracy and impossibility of reading. Therefore, it is necessary to decrease a rotational speed of the encoder to a certain level. Accordingly, there is a problem that the absolute encoder cannot read a measuring target that is continuously moving at high speed.

In addition, even if a measuring target is moving at low speed that allows measurement, a gap between a read measured value of the absolute encoder and a real position is caused by time difference in detection processing, which is another problem.

SUMMMARY OF THE INVENTION

The present invention relates to a rotary encoder for detecting an angle, and to an encoder reading device that projects a pattern formed on an encoder onto a light receiving means using light emitted from a light source means so as to read a position of the encoder. The light source means is configured to emit a pulse that is synchronized with a shift pulse which moves an electric charge to a transfer gate of the light receiving means, and that is sufficiently shorter than a time interval (accumulation time) of the shift pulse.

BRIEF DESCRIPTION OF THE DRAWINGS

Diagrams illustrating embodiments of the present invention will be listed as below.

FIG. 2 is a diagram illustrating an electric configuration of an encoder-reading device according to a second embodiment of the present invention;

DESCRIPTION OF THE PREFERRED EMBODIMENTS

Hereinafter, preferred embodiments of the present invention will be described with reference to drawings.

First Embodiment

Figure 1:
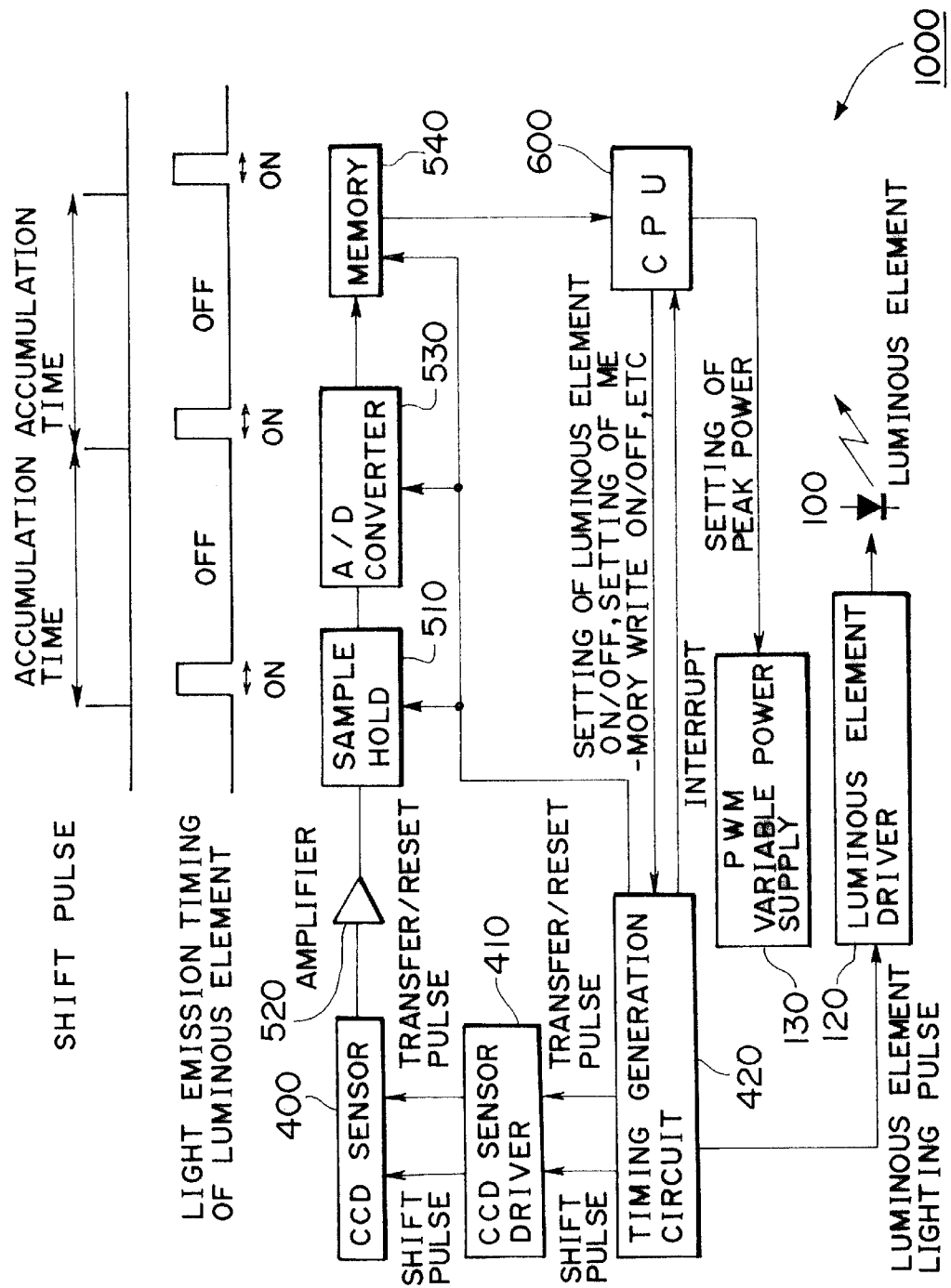
FIG. 1 is a diagram illustrating an electric configuration of an encoder-reading device according to a first embodiment of the present invention.

FIG. 1 illustrates an electric configuration of an encoder-reading device 1000 according to a first embodiment. The encoder reading device 1000 comprises a luminous element 100, a luminous element driver 120, a PWM variable power supply 130, a CCD sensor 400, a CCD sensor driver 410, a timing generation circuit 420, a sample hold 510, an amplifier 520, an A/D converter 530, a memory 540, and a CPU 600.

The luminous element driver 120 drives the luminous element 100 according to a timing signal of the timing generation circuit 420. The CCD sensor driver 410 supplies signals such as a shift pulse, and a transfer/reset pulse, which are required by the CCD sensor 400 to form a light-receiving signal.

The sample hold 510 samples and holds a light-receiving signal, which comes from the CCD sensor 400, according to a timing signal of the timing generation circuit 420.

The amplifier 520 is used for amplifying a signal that has been sampled and held in the sample hold 510. The amplified signal is converted into a digital signal by the A/D converter 530 before the digital signal is stored in the memory 540.

The CPU 600 corresponds to a processing means, which includes a RAM, and a ROM. The CPU 600 performs various kinds of processing, and controls the position detection device 1000 as a whole.

In the next place, an electronic signal will be described in detail with reference to FIG. 1.

The CCD sensor 400 is a light-receiving sensor that converts incident light into an electric charge. The CCD sensor 400 corresponds to a light receiving means.

The CPU 600 controls the CCD sensor driver 410 through the timing generation circuit 420, and is configured to receive a light-receiving signal from the CCD sensor 400. To be more specific, by supplying a shift pulse, a transfer/reset pulse, and the like, it is possible to discharge an accumulated electric charge of the CCD sensor 400.

The CPU 600 is configured to transmit a driving signal to the luminous element driver 120 so as to generate a pulse that is synchronized with a shift pulse for moving an electric charge to a transfer gate of the CCD sensor 400, and that is sufficiently shorter than a time interval (accumulation time) of the shift pulse in terms of time. The luminous element driver 120 is configured to drive the luminous element 100 so as to emit a pulse that is synchronized with a shift pulse, and that is sufficiently shorter than a time interval (accumulation time) of the shift pulse in terms of time.

In addition, the CPU 600-can adjust peak power of the luminous element 100 by keeping accumulation time of the CCD sensor 400 constant, and by controlling the PWM variable power supply 130 to make electric energy variable, which is supplied to the luminous element driver 120. As a result, an output voltage of the CCD sensor 400 can be adjusted.

Second Embodiment

FIG. 2 illustrates an electric configuration of an encoder reading device 2000 according to a second embodiment. The encoder reading device 2000 comprises a first luminous element 101, a second luminous element 102, a first luminous element driver 121, a second luminous element driver 122, a first PWM variable power supply 131, a second PWM variable power supply 132, a first CCD sensor 401, a second CCD sensor 402, a first CCD sensor driver 411, a second CCD sensor driver 412, the timing generation circuit 420, a first sample hold 511, a second sample hold 512, a first amplifier 521, a second amplifier 522, a first A/D converter 531, a second A/D converter 532, a first memory 541, a second memory 542, and the CPU 600.

The first CCD sensor 401 and the second CCD sensor 402 are placed at positions that deviate from each other by 180 degrees. In addition, the first CCD sensor 401 and the second CCD sensor 402 operate in synchronization with each other so that accumulation time of the first CCD sensor 401 becomes equal to that of the second CCD sensor 402.

The first luminous element driver 121 drives the first luminous element 101 according to a timing signal of the timing generation circuit 420. The first CCD sensor driver 411 supplies signals such as a shift pulse, and a transfer/reset pulse, which are required by the first CCD sensor 401 to form a light-receiving signal.

The first sample hold 511 samples and holds a light-receiving signal, which comes from the first CCD sensor 401, according to a timing signal of the timing generation circuit 420.

The first amplifier 521 is used for amplifying an output signal of the first CCD sensor 401. The amplified signal is sampled and held by the first sample hold 511. Then, the signal is converted into a digital signal by the first A/D converter 531 before the converted signal is stored in the first memory 541.

The CPU 600 controls the first CCD sensor driver 411 through the timing generation circuit 420, and is configured to receive a light-receiving signal from the first CCD sensor 401. To be more specific, by supplying a shift pulse, a transfer/reset pulse, and the like, it is possible to output an accumulated electric charge of the first CCD sensor 401.

The timing generation circuit 420 is configured to transmit a driving signal to the first luminous element driver 121 so as to generate a pulse that is synchronized with a shift pulse for moving an electric charge to a transfer gate of the first CCD sensor 401, and that is sufficiently shorter than a time interval (accumulation time) of the shift pulse in terms of time. The first luminous element driver 121 is configured to drive the first luminous element 101 so as to emit a pulse that is synchronized with a shift pulse, and that is sufficiently shorter than a time interval (accumulation time) of the shift pulse in terms of time.

Since the second luminous element 102, the second luminous element driver 122, the second PWM variable power supply 132, the second CCD sensor 402, the second CCD sensor driver 412, the timing generation circuit 420, the second sample hold 512, the second amplifier 522, the second A/D converter 532, and the second memory 542 operate similarly, the descriptions thereof will be omitted.

The first CCD sensor 401 and the second CCD sensor 402 are placed at positions that deviate from each other by 180 degrees. Therefore, it is possible to prevent a measurement error caused by the eccentricity of the rotary center of an encoder.

To be more specific, the following effect is produced: operating the first CCD sensor 401 and the second CCD sensor 402 in synchronization with each other, and controlling the first luminous element 101 and the second luminous element 102 so that they emit a pulse, enable measurement with accuracy without time deviation even if the encoder is working.

In this connection, the CPU 600 can adjust peak power of the first luminous element 101 by keeping accumulation time of the first CCD sensor 401 constant, and by controlling the first PWM variable power supply 131 to make electric energy variable, which is supplied to the first luminous element driver 121. As a result, an output voltage of the first CCD sensor 401 can be adjusted.

In a similar manner, the CPU 600 can adjust peak power of the second luminous element 102 by keeping accumulation time of the second CCD sensor 402 constant, and by controlling the second PWM variable power supply 132 to make electric energy variable, which is supplied to the second luminous element driver 122. As a result, an output voltage of the second CCD sensor 402 can be adjusted.

Since other parts of the configuration of the second embodiment are similar to those of the first embodiment, the description will be omitted.

According to the first embodiment and the second embodiment that are configured as above, even when the encoder is working, it is possible to obtain a high-contrast encoder waveform by emitting a pulse in synchronization with a shift pulse. In other words, an effect of obtaining a high-contrast encoder waveform is produced as if stroboscopic photography were employed.

In addition, controlling an output voltage of the CCD sensor 400 by the use of peak power of the luminous element 100 permits the CCD sensor 400 to operate in the shortest accumulation time every time, enabling high speed reading of the encoder, which is another effect.

Figure 3:
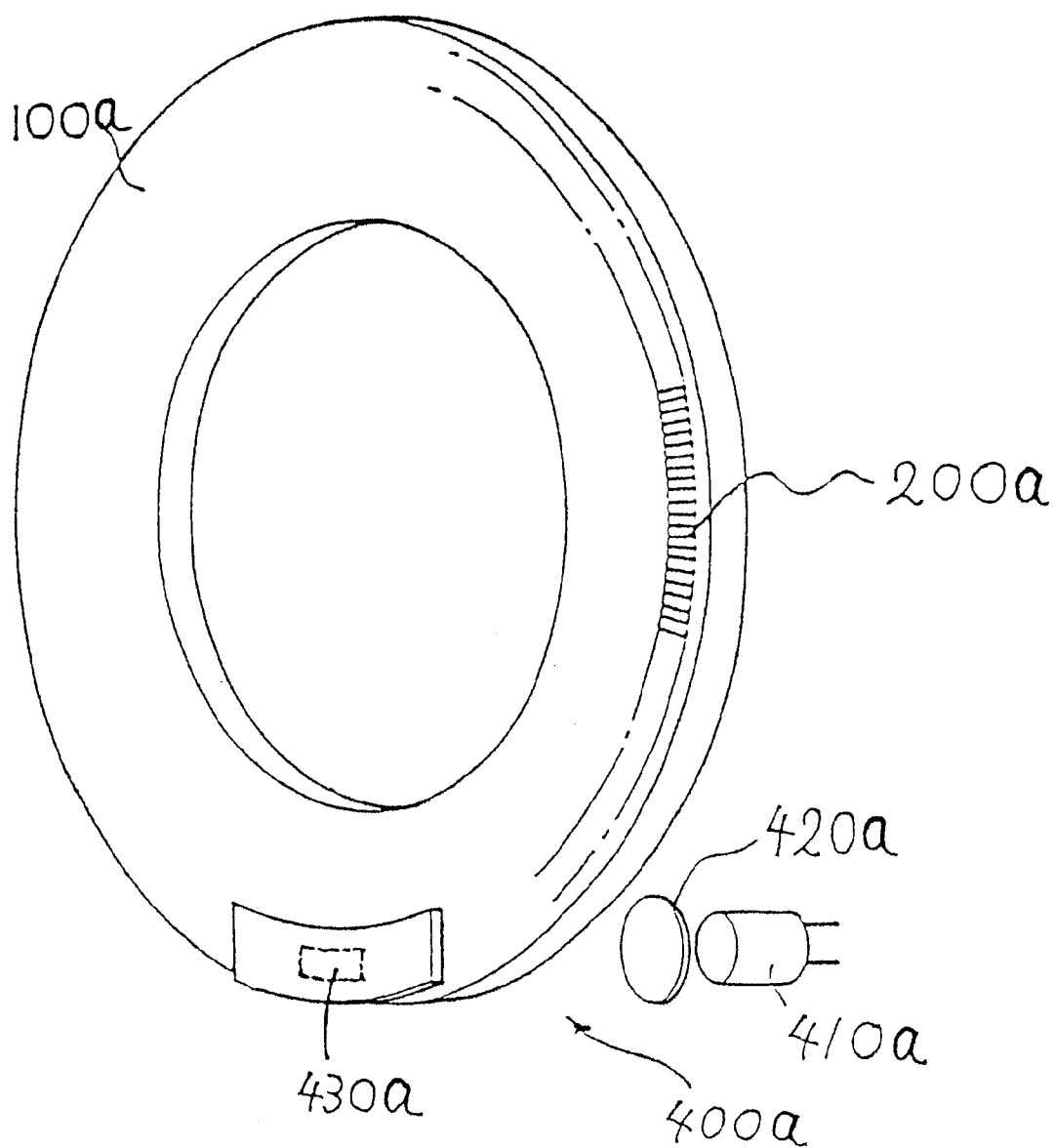
FIG. 3 is a diagram illustrating an encoder according to this embodiment.

Here, an encoder main body will be described in detail. As shown in FIG. 3, a scale 200a formed in a rotor 100a has patterns for which space modulation is performed. The patterns include at least a first pattern modulated in a first period, and a second pattern modulated in a second period that is different from the first period. The first pattern and the second pattern are successively aligned at equal pitches in a rotative direction.

To be more specific, space modulation which changes a line width is adopted into modulation of the first pattern and the second pattern.

A scale detecting means 400a is configured to sandwich the rotor 100a, and comprises a luminous element 410a, a collimator 420a, and a linear sensor 430a.

It is to be noted that in this embodiment, a CCD light receiving element is used as the linear sensor 430a, and that a size of the CCD light receiving element is large enough to receive a plurality of patterns. In addition, although this embodiment has a configuration in which one CCD light-receiving element is used, a configuration using two CCD light receiving elements may also be employed. Reading performed by two CCD light receiving-elements that face each other can eliminate an eccentric error between a center of rotation and the encoder.

Figure 4:
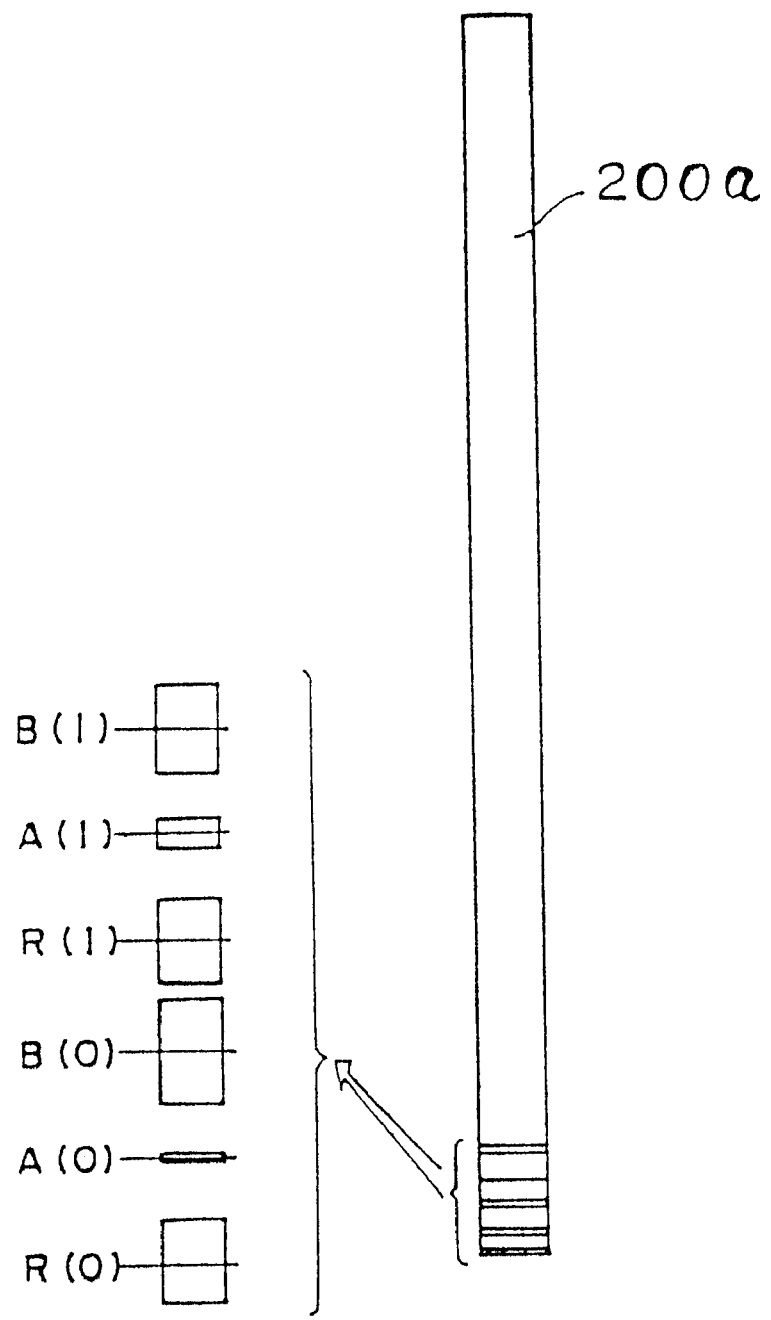
FIG. 4 is a diagram illustrating an encoder according to this embodiment.

Here, in order to simplify the description, a scale 200, which is formed in the shape of a concentric circle on the rotor 100a, is developed to describe the scale 200 as a straight line as shown in FIG. 4.

The scale 200 formed in the shape of a concentric circle on a rotor 100 includes the first pattern A, the second pattern B, and the third pattern R that are repeatedly aligned at equal intervals (p) as shown in FIG. 4. To be more specific, three kinds of patterns are treated as one set, and each block is successively formed on a set basis. If a block aligned at the leftmost position is defined as block 0 and thereby the block is described as R (0), A (0), B (0), blocks are repeatedly aligned as follows: R (1), A(1), B (1), R (2), A(2), B (2), . . . In this connection, because all patterns are repeated at equal intervals p, a signal corresponding to this interval is treated as a reference signal.

Figure 5:
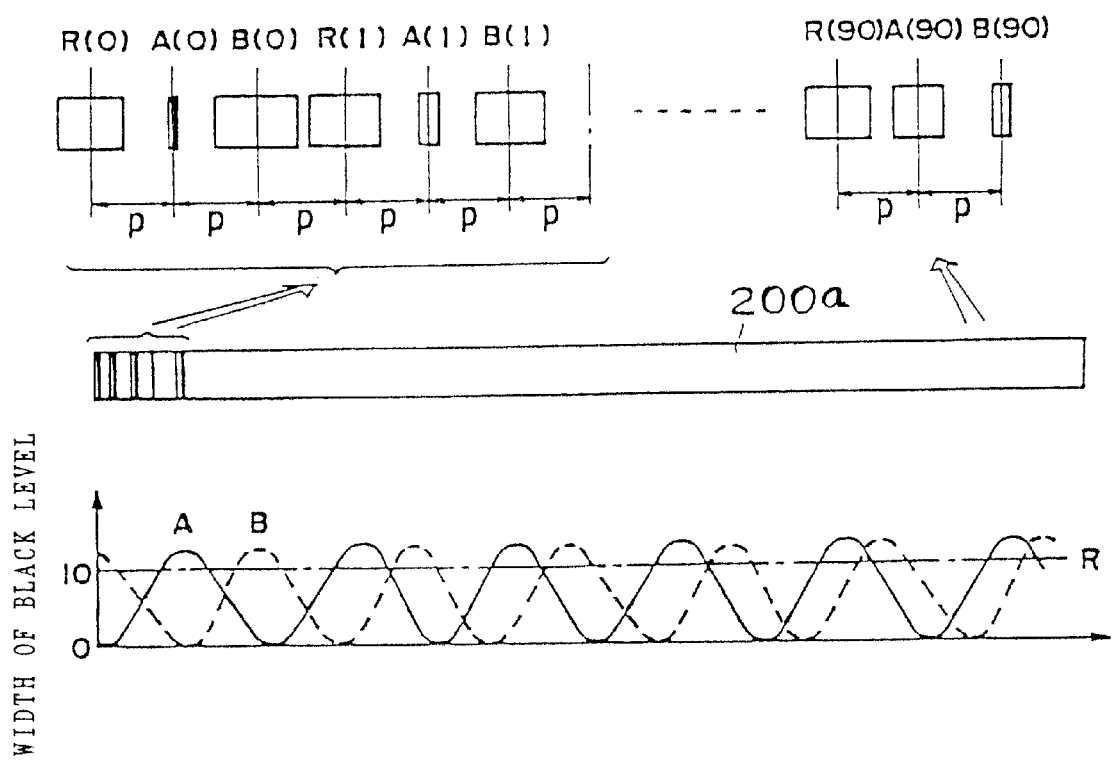
FIG. 5 is a diagram illustrating an encoder according to this embodiment.

In this embodiment, the equal interval (p) is set at 183.8 second, for example, (if it is converted into an angle, at every 183.8 second) However, any interval distance (interval angle) can be adopted. Further, the third pattern R uses a fixed width; in the first pattern A, a black part width is modulated so that one period becomes equal to 360 degrees divided by 50; and in the second pattern B, a black part width is modulated so that one period becomes equal to 360 degrees divided by 47. It is to be noted that if a period of the first pattern A is slightly different from that of the second pattern B, any period can be used. In this connection, a state of modulation of the first pattern A and the second pattern B is illustrated in FIG. 5.

Because a period of the first pattern A is slightly different from that of the second pattern B, a similar pattern appears at one revolution that is the least common multiple of both (a point of agreement). Therefore, a phase difference between a signal caused by the first pattern A and a signal caused by the second pattern B varies from 0 to 2 in a period, within a range of one revolution of the rotor 100.

Accordingly, if a phase is determined, it becomes possible to know how a set of the first pattern A, the second pattern B, and the third pattern R corresponds to a position on the scale 200 formed in the shape of a concentric circle in the rotor 100a.

It is to be noted that the third pattern R is used as a criterion of a signal for excluding influence of disturbance light.

The present invention, which is configured as above, relates to an encoder reading device that projects a pattern on an encoder onto a light receiving means using light from a light source means, and that reads a position of the encoder. The light source means is configured to emit a pulse that is synchronized with a shift pulse for moving an electric charge to a transfer gate of the light receiving means, and that is sufficiently shorter in time than a time interval (accumulation time) of the shift pulse. Therefore, it is possible to obtain a high-contrast encoder waveform even when the encoder is working, which is an effect of the present invention.

In addition, the present invention has another effect as follows: controlling output voltage of the light receiving means by the use of peak power of the light source means permits the light receiving means to operate in the shortest accumulation time every time, enabling high speed reading of the encoder.

Moreover, since two light receiving means are placed at positions that deviate from each other by 180 degrees, the present invention has another excellent effect of preventing a measurement error caused by the eccentricity of the rotary center of the encoder.

What is claimed is:

1. An absolute endorder that projects a patter formed on a concentrically formed encoder onto a light receiving means using light emitted from a light source means so as to read a position of the encoder, wherein said light source means is configured to emit a pulse that is synchronized with a shift pulse for moving an electric charge to a transfer gate of the light receiving means, and that is sufficiently shorter than a time interval (accumulation time) of the shift pulse said patter being able to change a line width, and said light receiving means having a magnitude sufficient to receive a plurality of light positions.

2. An encoder absolute according to claim 1, wherein the time interval of the light receiving means is substantially constant; and an output voltage of the light receiving means is adjusted by adjusting peak power of the light source.

3. An encoder reading device that projects a pattern formed on an encoder onto a light receiving means using light emitted from a light source means so as to read a position of the encoder, comprising:

at least two light source means; and two light receiving means placed at positions that deviate from each other by 180 degrees, wherein the light source means can each emit a pulse that is sufficiently shorter than a time interval (accumulation time) of a shift pulse in terms of time, and the light source means can each emit a pulse in synchronization; and wherein they light receiving means each operates in synchronization with the associated light source means so that an accumulation time becomes the same, whereby a measurement error caused by the eccentricity of the rotary center of the encoder is prevented.

4. An encoder reading device according to claim 3, wherein output voltages of the two light receiving means are adjusted by adjusting peak power of the two light sources individually while accumulation times of the two light receiving means is kept constant.

* * * * *